L. T. WRIGHT.
TREATMENT OF PYRITE OR OTHER IRON SULFIDS.
APPLICATION FILED NOV. 18, 1912.
1,164,049.
Patented Dec. 14, 1915.
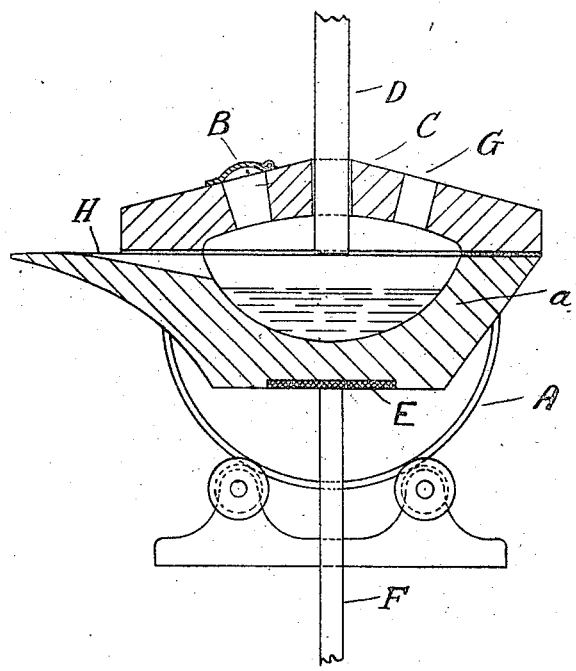

UNITED STATES PATENT OFFICE.

LEWIS THOMPSON WRIGHT, OF LONDON, ENGLAND.

TREATMENT OF PYRITE OR OTHER IRON SULFIDS.

1,164,049.  Specification of Letters Patent.  Patented Dec. 14, 1915.

Application filed November 18, 1912. Serial No. 732,143.

*To all whom it may concern:*

Be it known that I, LEWIS THOMPSON WRIGHT, a resident of London, England, a subject of the King of the United Kingdom of Great Britain and Ireland, have invented a certain new and useful Improvement in the Treatment of Pyrite or other Iron Sulfids, of which the following is a specification.

It has long been known that pyrite ($FeS_2$) when heated to redness parts with some portion of its sulfur as such. Indeed formerly sulfur was obtained by bringing the pyrite to red heat but the amount of sulfur recovered was considerably less than one half of the sulfur contained in the pyrite *i. e.* at a red heat, about 900°C., 15 to 17% of sulfur comes as such off from pyrites containing 50% of sulfur.

I have ascertained as a result of experimental research that when pyrite is brought to the high temperature of the electric furnace, viz. to a temperature in the region of 3000°C., practically all of the sulfur is distilled off, leaving a more or less pure residue of metallic iron. On this discovery I base my invention which consists in a process for the manufacture of iron and, if desired, also sulfur from iron sulfids such as pyrite. For this purpose I heat sulfids of iron in any suitable form of electric furnace which I may inclose so as to form of it a kind of still if it be an object to recover the sulfur in the free state.

An apparatus for use in performance of the process is illustrated diagrammatically in the accompanying drawing:

Referring to the drawing, A is the base of a tilting electric furnace having a suitable lining $a$ and fitted with charging door B in the closed detachable cover C and into the furnace is introduced a charge of fresh pyrite or other suitable sulfid of iron or of pyrite that has already had some proportion of its sulfur removed in some other furnace. D is a carbon electrode entering through the cover C of the furnace and E is a metal electrode at the base of the furnace connected to a conductor F; the current being taken off through the charge or in arcing spaces therein and through the bottom. The cover is provided with an aperture G through which the sulfur vapors are led to a condenser. By taking samples of the molten mass at intervals the progress of the operation can be watched. The molten mass can be tested for instance on an anvil and the operation stopped when a sufficiently pure metallic iron is obtained. In case the pyrite or sulfid of iron is mixed with earthy matter or gangue, a slag will be formed at the high temperature attained. On completion of the operation the slag is removed and then the charge of more or less pure metallic iron is poured out by means of the spout H into suitable molds and a fresh charge of pyrite introduced.

Having described my invention, I declare that what I claim and desire to secure by Letters Patent of the United States is:—

1. A process of substantially completely desulfurizing sulfid of iron consisting in decomposing the sulfid at a temperature in the region of 3000° C. and driving off substantially all of the sulfur contents from the iron.

2. A process for the recovery of iron from sulfid of iron consisting in subjecting the sulfid to a temperature in the region of 3000° C. until substantially all the sulfur contained in the sulfid has been driven off.

3. A process for the recovery of sulfur from sulfid of iron consisting in subjecting the sulfid to a temperature in the region of 3000° C. until substantially all the sulfur contained in the sulfid has been driven off, and collecting the sulfur evolved.

4. A process for the recovery of sulfur in elemental form from sulfid of iron consisting in distilling off substantially all the sulfur content of the sulfid at a temperature in the region of 3000° C.

In testimony whereof I have signed my name to this specification in the presence of two subscribing witnesses.

LEWIS THOMPSON WRIGHT.

Witnesses:
ALFRED J. BURBERY,
O. J. WORTH.